United States Patent
Ahn et al.

(10) Patent No.: US 11,747,988 B2
(45) Date of Patent: Sep. 5, 2023

(54) SEMICONDUCTOR MEMORY APPARATUS AND SEMICONDUCTOR MEMORY SYSTEM FOR CONTROLLING TRANSMISSION BANDWIDTH

(71) Applicant: SK hynix Inc., Icheon-si (KR)

(72) Inventors: Chang Yong Ahn, Icheon-si (KR); Sung Hak Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 115 days.

(21) Appl. No.: 17/537,172

(22) Filed: Nov. 29, 2021

(65) Prior Publication Data
US 2023/0032148 A1    Feb. 2, 2023

(30) Foreign Application Priority Data

Jul. 27, 2021 (KR) .......................... 10-2021-0098687

(51) Int. Cl.
*G06F 3/06* (2006.01)
(52) U.S. Cl.
CPC .......... *G06F 3/0613* (2013.01); *G06F 3/0655* (2013.01); *G06F 3/0679* (2013.01)
(58) Field of Classification Search
CPC .... G06F 3/0613; G06F 3/0655; G06F 3/0679; G06F 3/0635
See application file for complete search history.

(56) References Cited

U.S. PATENT DOCUMENTS

| | | |
|---|---|---|
| 8,095,851 B2 | 1/2012 | Diggs et al. |
| 2015/0058531 A1* | 2/2015 | Yeh ..................... G06F 12/0246 |
| | | 711/103 |
| 2019/0140668 A1* | 5/2019 | Kim .................... G06F 11/1068 |

FOREIGN PATENT DOCUMENTS

KR     1020170052576 A     5/2017

OTHER PUBLICATIONS

Dongwook Kim et al., Efficient Metadata Management Scheme in NAND Flash based Storage Device, Journal of Digital Contents Society vol. 16 No. 4 Aug. 2015 (pp. 535-543), http://dx.doi.org/10.9728/dcs.2015.16.4 535.
Yu Cai et al., Errors in Flash-Memory-Based Solid-State Drives: Analysis, Mitigation, and Recovery, arXiv:1711.11427v2 [cs.AR] Jan. 5, 2018, pp. 1-86.

* cited by examiner

*Primary Examiner* — Jane W Benner
(74) *Attorney, Agent, or Firm* — WILLIAM PARK & ASSOCIATES LTD.

(57) ABSTRACT

A semiconductor memory apparatus includes a memory bank circuit and a bandwidth control circuit. The memory bank circuit stores normal data, an error correction code, and a meta information code. The bandwidth control circuit controls bandwidths of the error correction code and the meta information code based on bandwidth option information.

20 Claims, 6 Drawing Sheets

SEMICONDUCTOR MEMORY APPARATUS AND SEMICONDUCTOR MEMORY SYSTEM FOR CONTROLLING TRANSMISSION BANDWIDTH

CROSS-REFERENCES TO RELATED APPLICATION

The present application claims priority under 35 U.S.C. § 119(a) to Korean application number 10-2021-0098687, filed on Jul. 27, 2021, in the Korean Intellectual Property Office, which is incorporated herein by reference in its entirety.

BACKGROUND

1. Technical Field

Various embodiments may generally relate to a semiconductor memory apparatus and a semiconductor memory system, and more particularly, to a semiconductor memory apparatus and a semiconductor memory system which provide an error correction code and a meta information code.

2. Related Art

In general, integrated circuits including semiconductor apparatuses and semiconductor memory apparatuses transmit and receive lots of data. Errors in the transmitted and received data occur due to various reasons. Since the errors occurring in the data cause fatal errors in operations of the integrated circuits, solutions for the errors are required. Error correction code (ECC) engines are typically used to resolve the errors occurring in the data.

ECC engines detect errors occurring in data and correct the errors to generate stable data. The ECC engines largely perform two operations. The first operation is an operation which decodes data to generate error correction parity bit information which can correct errors in the data. The second operation is an operation which encodes the error correction parity bit information and the data to generate normal data. With the development in the process technology of the integrated circuits, at least partial functions of the ECC engine are mounted on the latest integrated circuits to enhance operation efficiency. This is called an on-chip ECC scheme.

The integrated circuits use meta information codes to perform circuit operations more efficiently. The meta information codes include additional information in transmitting and receiving data, for example, various information such as temperature information, status information, and operation information. The meta information codes also include information related to a read operation and a write operation of data and error information of data in the read operation and the write operation. For example, the error information of the data include information for attempt to correct errors in the corresponding data in the read operation, status information of an error, information for the number of errors, information for an address of an error, information for frequency of an error, and the like. Further, the meta information codes also include various information for a control circuit which transmits and receives data to and from the integrated circuit. Specifically, the meta information code include reliability information for data.

With the developments in the process and circuit technology of the integrated circuits, the amount of data transmitted to and received from the integrated circuits has been increasing. As the amount of data is increased, the amount of error correction codes corresponding to the error correction parity bit information has also been increasingly increased. Further, the amount of meta information codes has also been increasingly increased. Therefore, the integrated circuits are in a desperate need of efficient management of error correction codes and meta information codes.

SUMMARY

In an embodiment of the present disclosure, a semiconductor memory apparatus may include: a memory bank circuit configured to store normal data, an error correction code, and a meta information code; and a bandwidth control circuit configured to set a ratio between a memory region of the memory bank circuit in which the error correction code is to be stored and a memory region of the memory bank circuit in which the meta information code is to be stored by controlling transmission bandwidths of the error correction code and the meta information code based on bandwidth option information.

In an embodiment of the present disclosure, a semiconductor memory apparatus may include: a memory bank circuit configured to store normal data and a meta information code; an error code generation circuit configured to generate an error correction code by decoding the normal data; and a bandwidth control circuit configured to set output bandwidths of the error correction code and the meta information code by controlling transmission bandwidths of the error correction code and the meta information code based on bandwidth option information.

In an embodiment of the present disclosure, a semiconductor memory system may include: a controller configured to transmit normal data, an error correction code, and a meta information code and configured to provide bandwidth option information; and a semiconductor memory apparatus configured to receive and store the normal data, the error correction code, and the meta information code, from the controller, and transmit the normal data, the error correction code, and the meta information code that are stored therein to the controller based on the controller. Transmission bandwidths of the error correction code and the meta information code that are transmitted and received between the controller and the semiconductor memory apparatus may be controlled based on the bandwidth option information.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

The description of the present disclosure is an embodiment for a structural and/or functional description. The scope of rights of the present disclosure should not be construed as being limited to embodiments described in the specification. That is, the scope of rights of the present disclosure should be understood as including equivalents, which may realize the technical spirit, because an embodiment may be modified in various ways and may have various forms. Furthermore, objects or effects proposed in the present disclosure do not mean that a specific embodiment should include all objects or effects or include only such effects. Accordingly, the scope of rights of the present disclosure should not be understood as being limited thereby.

The meaning of the terms that are described in this application should be understood as follows.

The terms, such as the "first" and the "second," are used to distinguish one element from another element, and the scope of the present disclosure should not be limited by the terms. For example, a first element may be named a second element. Likewise, the second element may be named the first element.

An expression of the singular number should be understood as including plural expressions, unless clearly expressed otherwise in the context. The terms, such as "include" or "have," should be understood as indicating the existence of a set characteristic, number, step, operation, element, part, or a combination thereof, not excluding a possibility of the existence or addition of one or more other characteristics, numbers, steps, operations, elements, parts, or a combination thereof.

In each of the steps, symbols (e.g., a, b, and c) are used for convenience of description, and the symbols do not describe an order of the steps. The steps may be performed in an order different from the order described in the context unless a specific order is clearly described in the context. That is, the steps may be performed according to a described order, may be performed substantially at the same time as the described order, or may be performed in reverse order of the described order.

All the terms used herein, including technological or scientific terms, have the same meanings as those that are typically understood by those skilled in the art, unless otherwise defined. Terms defined in commonly used dictionaries should be construed as with the same meanings as those in the context in related technology and should not be construed as with ideal or excessively formal meanings, unless clearly defined in the application.

Embodiments are provided to a semiconductor memory apparatus and a semiconductor memory system capable of controlling transmission bandwidths of an error correction code and a meta information code.

Figure 1:
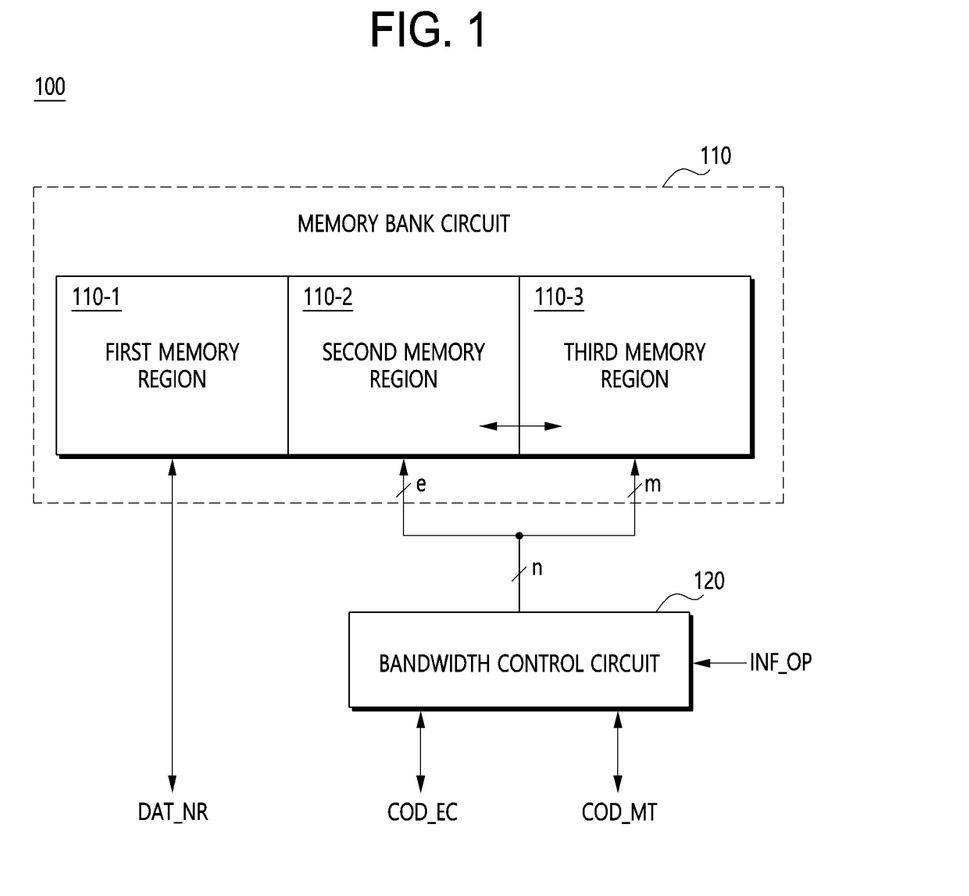
FIG. 1 is a block diagram illustrating a configuration of a semiconductor memory apparatus according to an embodiment of the present disclosure.

FIG. 1 is a block diagram illustrating a configuration of a semiconductor memory apparatus 100 according to an embodiment.

Referring to FIG. 1, the semiconductor memory apparatus 100 may include a memory bank circuit 110 and a bandwidth control circuit 120.

The memory bank circuit 110 may be configured to store normal data DAT_NR, an error correction code COD_EC, and a meta information code COD_MT. Here, the normal data DAT_NR may include data that is used in a read operation and a write operation of the semiconductor memory apparatus 100. The error correction code COD_EC may include error correction parity bit information for the normal data DAT_NR. The meta information code COD_MT may include reliability information for the normal data DAT_NR.

The memory bank circuit 110 may be configured of a memory cell circuit, a latch circuit, a register circuit, and the like. Here, for clarity, it has been illustrated in the embodiment that the normal data DAT_NR, the error correction code COD_EC, and the meta information code COD_MT may be stored in the memory bank circuit 110 that is configured of the memory cell circuits.

The memory bank circuit 110 will be described in detail below. The memory bank circuit 110 may include first to third memory regions 110-1, 110-2, and 110-3. The first memory region 110-1 may be configured to store the normal data DAT_NR. The second memory region 110-2 may be configured to store the error correction code COD_EC. The third memory region 110-3 may be configured to store the meta information code COD_MT.

Transmission bandwidths of the error correction code COD_EC and the meta information code COD_MT may be controlled based on bandwidth option information INF_OP, and detailed description thereof will be made below. For example, a ratio between the second memory region 110-2 in which the error correction code COD_EC is to be stored and the third memory region 110-3 in which the meta information code COD_MT is to be stored may be varied. In this example, the ratio between memory regions in the second memory region 110-2 and the third memory region 110-3 may be varied as indicated by an arrow that is illustrated between the second memory region 110-2 and the third memory region 110-3.

For example, the memory bank circuit 110 may be set in such a manner that at least a portion of the third memory region 110-3 may become a part of the second memory region 110-2 based on the bandwidth option information INF_OP. In another example, the memory bank circuit 110 may be set in such a manner that at least a portion of the second memory region 110-2 may become a part of the third memory region 110-3 based on the bandwidth option information INF_OP.

The bandwidth control circuit 120 may be configured to control the transmission bandwidths of the error correction code COD_EC and the meta information code COD_MT based on the bandwidth option information INF_OP. The bandwidth control circuit 120 may be configured to set the ratio between the memory regions, in which the error correction code COD_EC and the meta information code COD_MT are to be stored, by controlling the transmission bandwidths of the error correction code COD_EC and the meta information code COD_MT based on the bandwidth option information INF_OP. Here, the bandwidth option information INF_OP may be provided, for example, from a mode register set. The bandwidth option information INF_OP may include transmission bandwidth information for at least one code of the error correction code COD_EC and the meta information code COD_MT. Although not shown in FIG. 1, the bandwidth control circuit 120 may include configurations for controlling a read operation and a write operation of the memory bank circuit 110 with the above-described configuration.

Hereinafter, the transmission bandwidths of the error correction code COD_EC and the meta information code COD_MT that are output from the bandwidth control circuit 120 will be described. For clarity, it has been defined in the embodiment that the transmission bandwidth corresponding to the error correction code COD_EC is 'e' and the transmission bandwidth corresponding to the meta information code COD_MT is 'm'. It has been defined in the embodiment that a sum of the transmission bandwidths of the error correction code COD_EC and the meta information code COD_MT output from the bandwidth control circuit 120 is 'n' (where n is a natural number). Accordingly, a total transmission bandwidth of the error correction code COD_EC of the transmission bandwidth e and the meta information code COD_MT of the transmission bandwidth m may be 'n'. It has been assumed in the embodiment that n is 48.

When the bandwidth option information INF_OP includes information for setting the transmission bandwidth of the error correction code COD_EC as 48, the bandwidth control circuit 120 may output the error correction code COD_EC with the transmission bandwidth of 48. For example, the transmission bandwidth e of the error correction code COD_EC may be 48, which is the total transmission bandwidth n, and the transmission bandwidth m of the meta information code COD_MT may be 0 (zero). In this example, the error correction code COD_EC may be stored in both of the second memory region 110-2 and the third memory region 110-3. Specifically, the second memory region 110-2 may be extended to the third memory region 110-3, and thus, the entire memory region of the third memory region 110-3 may become a part of the second memory region 110-2.

When the bandwidth option information INF_OP includes information for setting the transmission bandwidth of the meta information code COD_MT as 48, the bandwidth control circuit 120 may output the meta information code COD_MT with the transmission bandwidth of 48. For example, the transmission bandwidth m of the meta information code COD_MT may be 48, which is the total transmission bandwidth n, and the transmission bandwidth e of the error correction code COD_EC may be 0 (zero). In this example, the meta information code COD_MT may be stored in both of the second memory region 110-2 and the third memory region 10_3. Specifically, the third memory region 110-3 may be extended to the second memory region 110-2, and thus, the entire memory region of the second memory region 110-2 may become a part of the third memory region 110-3.

The relationship between the transmission bandwidths of the error correction code COD_EC and the meta information code COD_MT based on the bandwidth option information INF_OP may be generalized below.

When the bandwidth option information INF_OP includes information for setting the transmission bandwidth of the error correction code COD_EC as 'e', the bandwidth control circuit 120 may output the error correction code COD_EC with the transmission bandwidth of 'e' and output the meta information code COD_MT with the transmission bandwidth of '48-e'. For example, the second memory region 110-2 may include a memory region corresponding to the transmission bandwidth 'e', and the third memory region 110-3 may include a memory region corresponding to the transmission bandwidth '48-e'.

Through the above-described configuration and operation, the bandwidth control circuit 120 may set the transmission bandwidths of the code correction code COD_EC and the meta information code COD_MT based on the bandwidth option information INF_OP. The ratio between the memory regions of the second memory region 110-2 and the third memory region 110-3, in which the error correction code COD_EC and the meta information code COD_MT are to be stored, may be set according to the set transmission bandwidths of the error correction code COD_EC and the meta information code COD_MT.

Accordingly, when the total transmission bandwidth n is used as the transmission bandwidth of the error correction code COD_EC, the semiconductor memory apparatus 100 may store more error correction parity bit information that is required for an error correction operation for the normal data DAT_NR. When the total transmission bandwidth n is used as the transmission bandwidth of the meta information code COD_MT, the semiconductor memory apparatus 100 may store more reliability information for the normal data DAT_NR. The semiconductor memory apparatus 100 may efficiently store the error correction code COD_EC and the meta information code COD_MT without an additional configuration for memory regions of the second memory region 110-2 and the third memory region 110-3, by setting the ratio between the memory regions of the second memory region 110-2 and the third memory region 110-3.

The semiconductor memory apparatus 100 according to an embodiment may set the transmission bandwidths of the error correction code COD_EC and the meta information code COD_MT based on the bandwidth option information INF_OP. The semiconductor memory apparatus 100 may efficiently store the error correction code COD_EC and the meta information code COD_MT according to the set transmission bandwidths.

Figure 2:
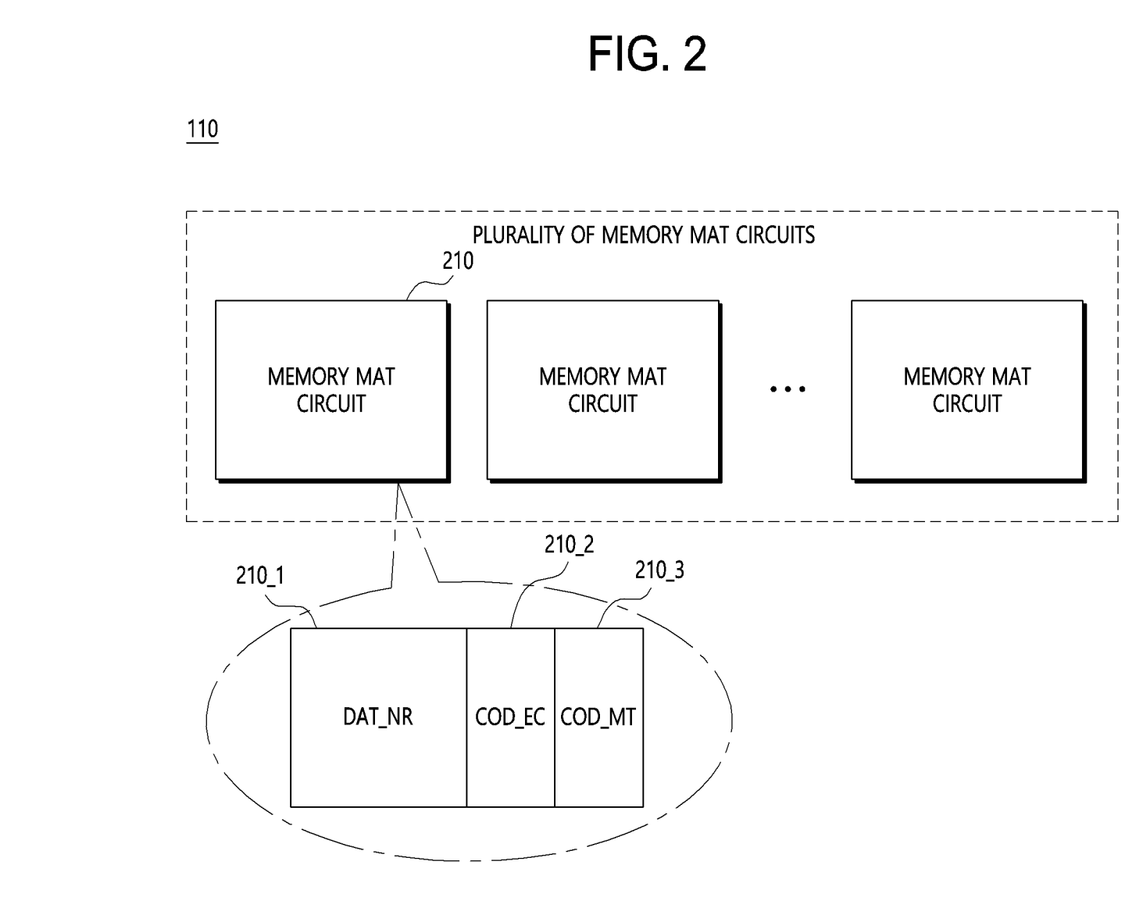
FIG. 2 is a block diagram illustrating a configuration of a memory bank circuit of FIG. 1.

FIG. 2 is a block diagram illustrating a configuration of the memory bank circuit 110 of FIG. 1.

Referring to FIG. 2, the memory bank circuit 110 may include a plurality of unit memory mat circuits 210. From the memory bank circuit 110, illustrated in FIG. 1, the plurality of unit memory mat circuits 210 may store the normal data DAT_NR, the error correction code COD_EC, and the meta information code COD_MT.

Hereinafter, for clarity, one unit memory mat circuit 210, among the plurality of unit memory mat circuits 210, will be described as a representative. The unit memory mat circuit 210 may include first to third memory regions 210_1, 210_2, and 210_3.

The first memory region 210_1 may be configured to store the normal data DAT_NR. The second memory region 210_2 may be configured to store the error correction code COD_EC. The third memory region 210_3 may be configured to store the meta information code COD_MT. When one unit memory mat circuit 210 is activated according to a read operation and a write operation for the normal data DAT_NR, the one unit memory mat circuit 210 may simultaneously output the error correction code COD_EC and the meta information code COD_MT that corresponds to the normal data DAT_NR.

The semiconductor memory apparatus 100, according to an embodiment, may store the error correction code COD_EC and the meta information code COD_MT with information related to the normal data DAT_NR in one unit memory mat circuits 210. Accordingly, the semiconductor memory apparatus 100 may more quickly perform the read and write operations on the error correction code COD_EC and the meta information code COD_MT related to the normal data DAT_NR.

Figure 3:
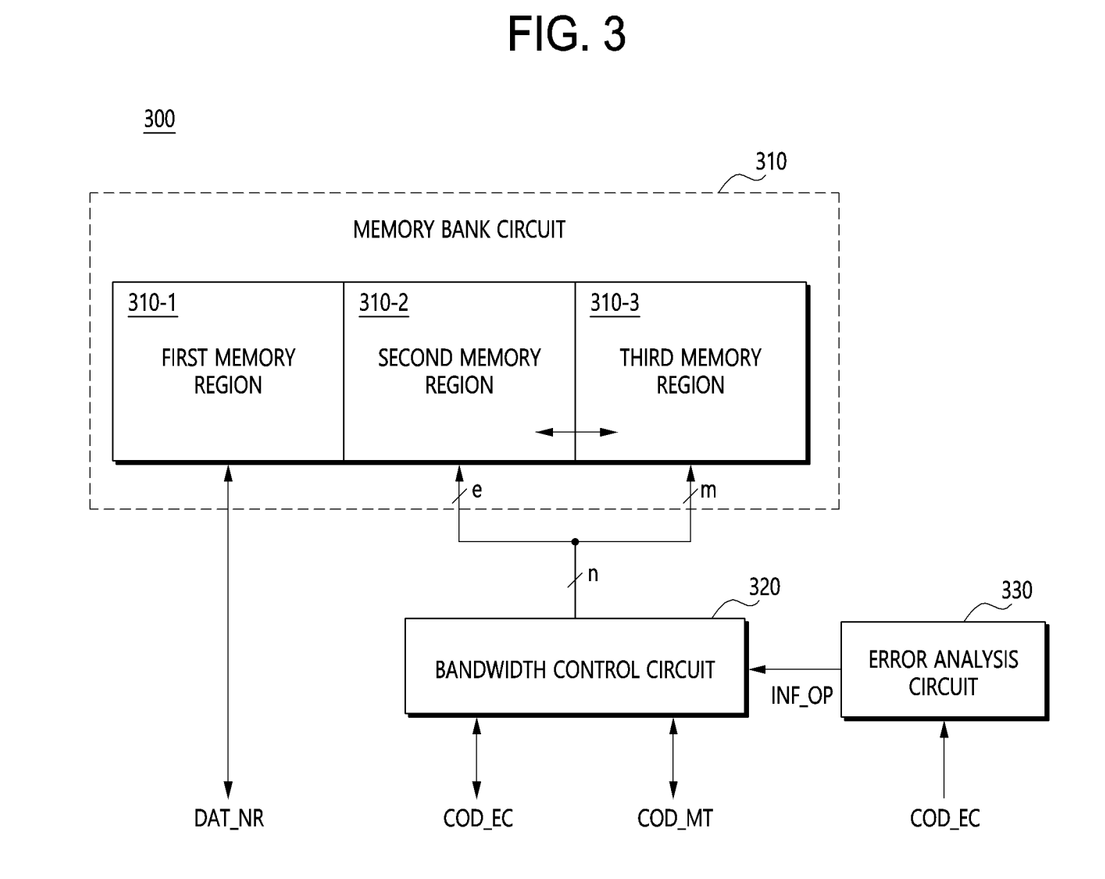
FIG. 3 is a block diagram illustrating a configuration of a semiconductor memory apparatus according to an embodiment of the present disclosure.

FIG. 3 is a block diagram illustrating a configuration of a semiconductor memory apparatus 300 according to an embodiment.

Referring to FIG. 3, the semiconductor memory apparatus 300, according to an embodiment, may include a memory bank circuit 310, a bandwidth control circuit 320, and an error analysis circuit 330. Here, the memory bank circuit 310 and the bandwidth control circuit 320 may correspond to the memory bank circuit 110 and the bandwidth control circuit 120 of FIG. 1. Therefore, the detailed operations of the memory bank circuit 310 and the bandwidth control circuit 320 of FIG. 3 will be omitted.

Hereinafter, the error analysis circuit 330 will be described in detail.

The error analysis circuit 330 may be configured to analyze and detect an error rate of the normal data DAT_NR based on the error correction code COD_EC. As described above, the error correction code COD_EC may include the error correction parity bit information for an error correction operation of the normal data DAT_NR. Accordingly, when the error correction code COD_EC is analyzed, the error rate of the normal data DAT_NR may be analyzed and detected. The error analysis circuit 330 may generate the bandwidth option information INF_OP that corresponds to the error rate of the normal data DAT_NR.

When the error rate of the normal data DAT_NR is large, the error analysis circuit 330 may control the bandwidth option information INF_OP so that much more error correction code COD_EC may be output from the bandwidth control circuit 320. For clarity, it is assumed that the total transmission bandwidth n is 48, and the transmission bandwidth of the error correction code COD_EC previously output from the bandwidth control circuit 320 is 32. Accordingly, the transmission bandwidth of the meta information code COD_MT that is previously output from the bandwidth control circuit 320 may be 16.

When the error rate of the normal data DAT_NR is large, the bandwidth control circuit 320 may output the error correction code COD_EC with the transmission bandwidth of 40 that is larger than the previous transmission bandwidth of 32 based on the bandwidth option information INF_OP. Accordingly, the transmission bandwidth of the error correction code COD_EC may be increased. The transmission bandwidth of the meta information code COD_MT may be reduced from 16 to 8. Subsequently, when the error rate of the normal data DAT_NR is very large, the bandwidth control circuit 320 may output the error correction code COD_EC with the maximum transmission bandwidth of 48. The meta information code COD_MT might not be output. Accordingly, the bandwidth control circuit 320 may control the transmission bandwidth of the error correction code COD_EC to be increased based on the increase for the error rate of the normal data DAT_NR.

When the error rate of the normal data DAT_NR is small, the error analysis circuit 330 may control the bandwidth option information INF_OP so that much more meta information code COD_MT may be output from the bandwidth control circuit 320. For clarity, when it is assumed that the transmission bandwidth of the meta information code COD_MT that is previously output from the bandwidth control circuit 320 is 16, the transmission bandwidth of the code correction code COD_EC that is previously output from the bandwidth control circuit 320 may be 32.

When the error rate of the normal data DAT_NR is small, the bandwidth control circuit 320 may output the meta information code COD_MT with the transmission bandwidth of 20 that is larger than the previous transmission bandwidth of 16 based on the bandwidth option information INF_OP. Accordingly, the transmission bandwidth of the meta information code COD_MT may be increased. The transmission bandwidth of the error correction code COD_EC may be reduced from 32 to 28. Subsequently, when the error rate of the normal data DAT_NR is very small, the bandwidth control circuit 320 may output the meta information code COD_MT with the maximum transmission bandwidth of 48. The error correction code COD_EC might not be output. Accordingly, the bandwidth control circuit 320 may control the transmission bandwidth of the meta information code COD_MT to be increased based on the decrease for the error rate of the normal data DAT_NR.

The semiconductor memory apparatus 300 according to an embodiment may control the transmission bandwidth of the error correction code COD_EC and the transmission bandwidth of the meta information code COD_MT based on the increase and decrease of the error rate of the normal data DAT_NR.

Figure 4:
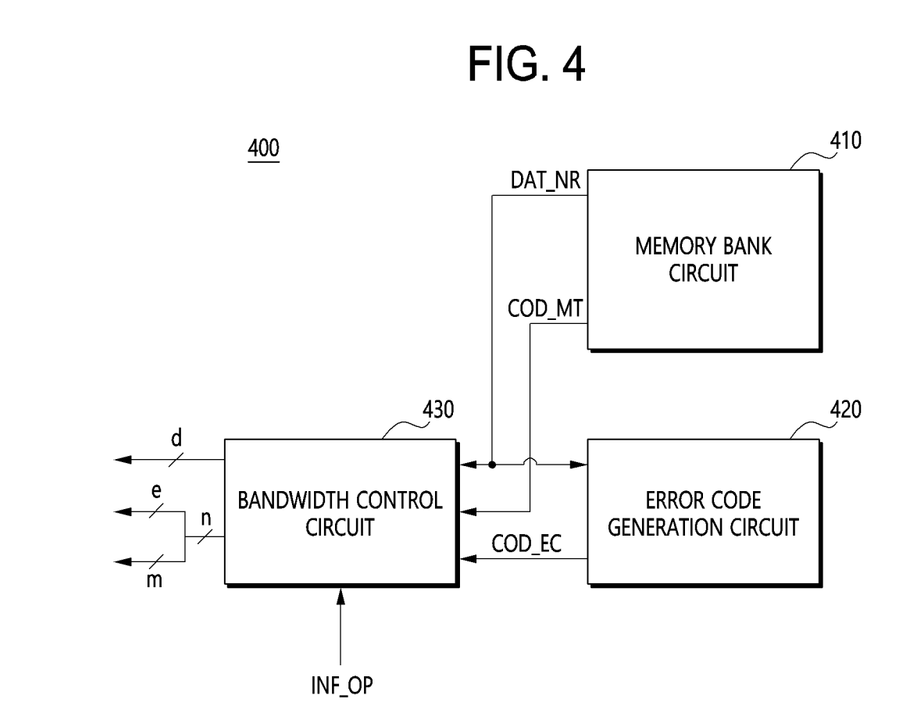
FIG. 4 is a block diagram illustrating a configuration of a semiconductor memory apparatus according to an embodiment of the present disclosure.

FIG. 4 is a block diagram illustrating a configuration of a semiconductor memory apparatus 400 according to an embodiment.

Referring to FIG. 4, the semiconductor memory apparatus 400 according to an embodiment may include a memory bank circuit 410, an error code generation circuit 420, and a bandwidth control circuit 430.

The memory bank circuit 410 may be configured to store the normal data DAT_NR and the meta information code COD_MT. The memory bank circuit 410 may correspond to the memory bank circuit 110 of FIG. 1. For example, the error correction code COD_EC may be stored in the error code generation circuit 420 to be described later. In another example, the error correction code COD_EC may be stored in the memory bank circuit 410 as described in FIGS. 1 to 3.

The error code generation circuit 420 may be configured to generate the error correction code COD_EC by decoding the normal data DAT_NR. The error code generation circuit 420 may be configured to include an error correction code (ECC) engine.

The bandwidth control circuit 430 may be configured to control the transmission bandwidths of the error correction code COD_EC and the meta information code COD_MT based on the bandwidth option information INF_OP. The bandwidth control circuit 430 may be configured to set the output bandwidths of the error correction code COD_EC and the meta information code COD_MT by controlling the transmission bandwidths of the error correction code COD_EC and the meta information code COD_MT. The bandwidth control circuit 430 may include configurations for outputting data to an external device.

The bandwidth control circuit 430 may receive the normal data DAT_NR and output the normal data DAT_NR with a transmission bandwidth d (where d is a natural number). The bandwidth control circuit 430 may receive the error correction code COD_EC and the meta information code COD_MT and may output the error correction code COD_EC and the meta information code COD_MT with the transmission bandwidth n. For example, the error correction code COD_EC may be output with the transmission bandwidth e, out of the transmission bandwidth n, and the meta information code COD_MT may be output with the transmission bandwidth m, out of the transmission bandwidth n. The bandwidth control circuit 430 may correspond to the bandwidth control circuit 120 of FIG. 1, and thus, detailed description for the bandwidth control circuit 430 will be omitted.

Hereinafter, an operation of the bandwidth control circuit 430 will be simply described.

When the bandwidth option information INF_OP includes information for setting the transmission bandwidth of the error correction code COD_EC as 48, the bandwidth control circuit 430 may output the error correction code COD_EC with the output bandwidth of 48. For example, the bandwidth control circuit 430 may output the error correction code COD_EC through 48 transmission lines.

When the bandwidth option information INF_OP includes information for setting the transmission bandwidth of the meta information code COD_MT as 48, the bandwidth control circuit 430 may output the meta information code COD_MT with the output bandwidth of 48. For example, the bandwidth control circuit 430 may output the meta information code COD_MT through 48 transmission lines.

Through the above-described configuration and operation, the semiconductor memory apparatus 400 may set the output bandwidth of the error correction code COD_EC and the output bandwidth of the meta information code COD_MT based on the bandwidth option information INF_OP. Accordingly, the semiconductor memory apparatus 400 may provide more error correction code COD_EC to an external device through all n transmission lines. The semiconductor memory apparatus 400 may provide more meta information code COD_MT to an external device through all n transmission lines.

Figure 5:
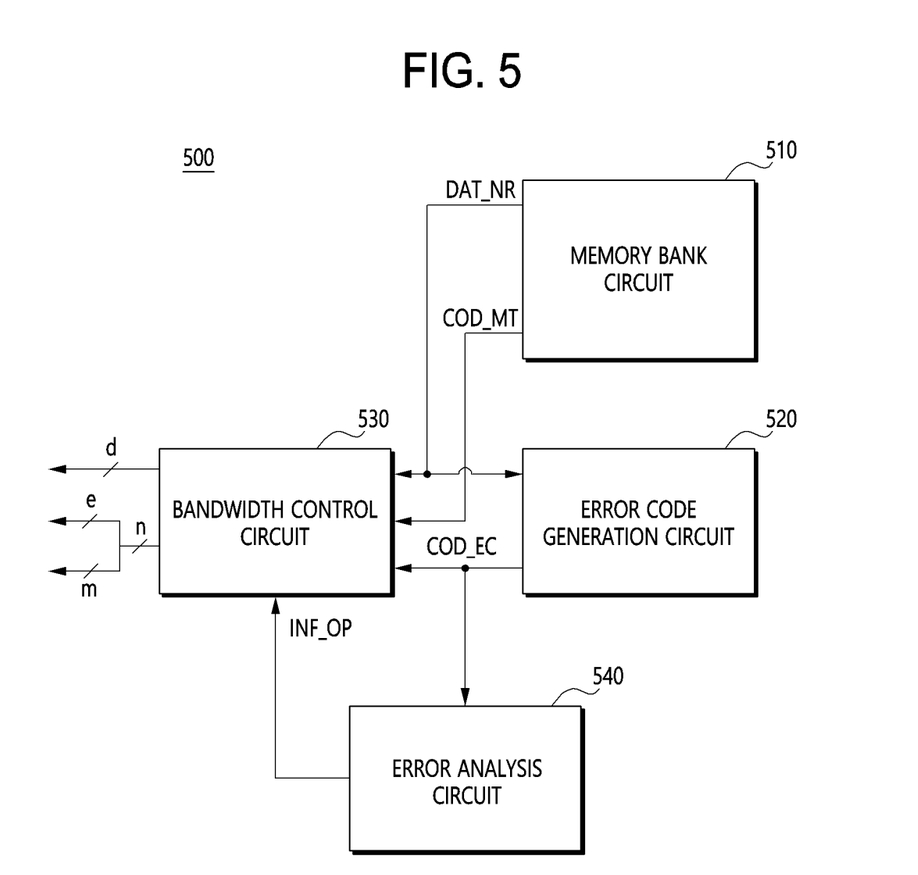
FIG. 5 is a block diagram illustrating a configuration of a semiconductor memory apparatus according to an embodiment of the present disclosure.

FIG. 5 is a block diagram illustrating a configuration of a semiconductor memory apparatus 500 according to an embodiment.

Referring to FIG. 5, the semiconductor memory apparatus 500 may include a memory bank circuit 510, an error code generation circuit 520, a bandwidth control circuit 530, and an error analysis circuit 540. Here, the memory bank circuit 510, the error code generation circuit 520, and the bandwidth control circuit 530 may correspond to the memory bank circuit 410, the error code generation circuit 420, and the bandwidth control circuit 430 of FIG. 4. The error analysis circuit 540 may correspond to the error analysis circuit 330 of FIG. 3.

Hereinafter, a circuit operation of the semiconductor memory apparatus 500 will be simply described.

The error analysis circuit 540 may be configured to analyze and detect the error rate of the normal data DAT_NR based on the error correction code COD_EC.

When the error rate of the normal data DAT_NR is large, the error analysis circuit 540 may control the bandwidth option information INF_OP so that more error correction code COD_EC may be output from the bandwidth control circuit 530. For example, the bandwidth control circuit 530 may control the transmission bandwidth of the error correction code COD_EC to be increased based on an increase of the error rate of the normal data DAT_NR. In this example, the bandwidth control circuit 530 may control the output bandwidth of the error correction code COD_EC to be increased based on the transmission bandwidth of the error correction code COD_EC.

When the error rate of the normal data DAT_NR is small, the error analysis circuit 540 may control the bandwidth option information INF_OP so that more meta information code COD_MT may be output from the bandwidth control circuit 530. For example, the bandwidth control circuit 530 may control the transmission bandwidth of the meta information code COD_MT to be increased based on a decrease of the error rate of the normal data DAT_NR. In this example, the bandwidth control circuit 530 may control the output bandwidth of the meta information code COD_MT to be increased based on the transmission bandwidth of the meta information code COD_MT.

The semiconductor memory apparatus 500 may set the transmission bandwidth of the error correction code COD_EC and the transmission bandwidth of the meta information code COD_MT based on the error rate of the normal data DAT_NR. Further, the semiconductor memory apparatus 500 may efficiently output the error correction code COD_EC and the meta information code COD_MT with the output bandwidths that correspond to the error rate of the normal data DAT_NR without additional transmission lines.

Figure 6:
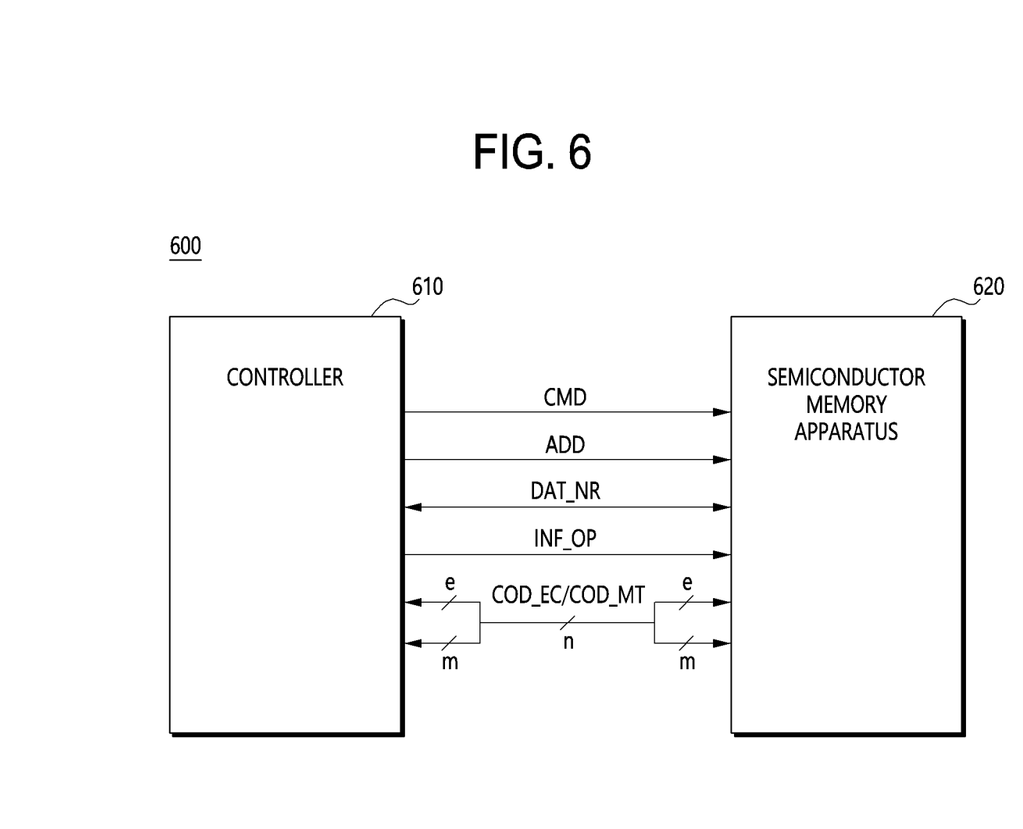
FIG. 6 is a block diagram illustrating a configuration of a semiconductor memory system according to an embodiment of the present disclosure.

FIG. 6 is a block diagram illustrating a configuration of a semiconductor memory system 600 according to an embodiment.

Referring to FIG. 6, the semiconductor memory system 600 may include a controller 610 and a semiconductor memory apparatus 620.

The controller 610 may be configured to transmit the normal data DAT_NR, the error correction code COD_EC, and the meta information code COD_MT to the semiconductor memory apparatus 620 and may provide the bandwidth option information INF_OP to the semiconductor memory apparatus 620. The controller 610 may provide a command signal CMD and an address signal ADD to the semiconductor memory apparatus 620 and may control various operations of the semiconductor memory apparatus 620 in addition to a read operation and a write operation of the semiconductor memory apparatus 620. The controller 610 may control the operations of the semiconductor memory apparatus 620 based on the command signal CMD. The controller 610 may control the normal data DAT_NR, the error correction code COD_EC, and the meta information code COD_MT to be stored in positions of the semiconductor memory apparatus 620 that corresponds to the address signal ADD.

Next, the semiconductor memory apparatus 620 may be configured to receive and store the normal data DAT_NR, the error correction code COD_EC, and the meta information code COD_MT from the controller 610. The semiconductor memory apparatus 620 may be configured to transmit the normal data DAT_NR, the error correction code COD_EC, and the meta information code COD_MT to the controller 610 based on the controller 610.

For example, the controller 610 may include the bandwidth control circuit 430 of FIG. 4. Although not shown in FIG. 6, the bandwidth control circuit that is included in the controller 610 may control the transmission bandwidths of the error correction code COD_EC and the meta information code COD_MT based on the bandwidth option information INF_OP. For example, the controller 610 may set the output bandwidths of the error correction code COD_EC and the meta information code COD_MT by controlling the transmission bandwidths of the error correction code COD_EC and the meta information code COD_MT. In this example, the controller 610 may output the error correction code COD_EC with the transmission bandwidth e and output the meta information code COD_MT with the transmission bandwidth m based on the bandwidth option information INF_OP.

In another example, the semiconductor memory apparatus 620 may include the bandwidth control circuit 430 of FIG. 4 like the controller 610. Although not shown in FIG. 6, the bandwidth control circuit that is included in the semiconductor memory apparatus 620 may control the transmission bandwidths of the error correction code COD_EC and the meta information code COD_MT based on the bandwidth option information INF_OP. For example, the semiconductor memory apparatus 620 may set the output bandwidths of the error correction code COD_EC and the meta information code COD_MT by controlling the transmission bandwidths of the error correction code COD_EC and the meta information code COD_MT. In this example, the semiconductor memory device 620 may output the error correction code COD_EC with the transmission bandwidth e and output the meta information code COD_MT with the transmission bandwidth m based on the bandwidth option information INF_OP.

The semiconductor memory system 600 may control the transmission bandwidths of the error correction code COD_EC and the meta information code COD_MT that are transmitted and received between the controller 610 and the semiconductor memory apparatus 620 based on the bandwidth option information INF_OP.

In another example, the semiconductor memory apparatus 620 may include the bandwidth control circuit 120 of FIG. 1. Although not shown in FIG. 6, the bandwidth control circuit that is included in the semiconductor memory apparatus 620 may control the transmission bandwidths of the error correction code COD_EC and the meta information code COD_MT based on the bandwidth option information INF_OP. For example, the semiconductor memory apparatus 620 may set the ratio between the memory regions, in which the error correction code COD_EC and the meta information code COD_MT are to be stored, by controlling the transmission bandwidths of the error correction code COD_EC and the meta information code COD_MT. In this example, the semiconductor memory device 620 may control the ratio between the memory regions, in which the error correction code COD_EC and the meta information code COD_MT are to be stored based on the bandwidth option information INF_OP.

The semiconductor memory system 600 may control the ratio between the memory regions, in which the error correction code COD_EC and the meta information code COD_MT are to be stored, based on the bandwidth option information INF_OP.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A semiconductor memory apparatus comprising:
a memory bank circuit configured to store normal data, an error correction code, and a meta information code; and
a bandwidth control circuit configured to set a ratio between a memory region of the memory bank circuit in which the error correction code is to be stored and a memory region of the memory bank circuit in which the meta information code is to be stored by controlling transmission bandwidths of the error correction code and the meta information code based on bandwidth option information.

2. The semiconductor memory apparatus of claim 1, wherein the error correction code includes error correction parity bit information for the normal data, and the meta information code includes reliability information for the normal data.

3. The semiconductor memory apparatus of claim 1, wherein the memory bank circuit includes:
a first memory region configured to store the normal data;
a second memory region configured to store the error correction code; and
a third memory region configured to store the meta information code,
wherein the memory bank circuit is configured to set, based on the bandwidth option information, so that at least a portion of the third memory region becomes a part of the second memory region or at least a portion of the second memory region becomes a part of the third memory region.

4. The semiconductor memory apparatus of claim 3, wherein the first to third memory regions are included in one unit memory mat circuit.

5. The semiconductor memory apparatus of claim 1, wherein the bandwidth option information includes transmission bandwidth information for at least one code of the error correction code and the meta information code.

6. The semiconductor memory apparatus of claim 1, further comprising an error analysis circuit configured to analyze and detect an error rate of the normal data based on the error correction code and generate the bandwidth option information based on the error rate of the normal data.

7. The semiconductor memory apparatus of claim 1, wherein the bandwidth control circuit is configured to control the transmission bandwidth of the error correction code based on an increase of an error rate of the normal data and control the transmission bandwidth of the meta information code based on a decrease of the error rate of the normal data.

8. A semiconductor memory apparatus comprising:
a memory bank circuit configured to store normal data and a meta information code;
an error code generation circuit configured to generate an error correction code by decoding the normal data; and
a bandwidth control circuit configured to set output bandwidths of the error correction code and the meta information code by controlling transmission bandwidths of the error correction code and the meta information code based on bandwidth option information.

9. The semiconductor memory apparatus of claim 8, wherein the error correction code includes error correction parity bit information for the normal data, and the meta information code includes reliability information for the normal data.

10. The semiconductor memory apparatus of claim 8, wherein the memory bank circuit is configured to store the error correction code that is provided from the error code generation circuit and configured to provide the stored error correction code to the bandwidth control circuit.

11. The semiconductor memory apparatus of claim 8, wherein the memory bank circuit includes a plurality of unit memory mat circuits, and
each of the plurality of unit memory mat circuits includes:
a first memory region configured to store the normal data;
a second memory region configured to store the error correction code; and
a third memory region configured to store the meta information code,
wherein the unit memory mat circuit is set, based on the bandwidth option information, so that at least a portion of the third memory region becomes a part of the second memory region, or at least a portion of the second memory region becomes a part of the third memory region.

12. The semiconductor memory apparatus of claim 8, wherein the bandwidth option information includes transmission bandwidth information for at least one code of the error correction code and the meta information code.

13. The semiconductor memory apparatus of claim 8, further comprising an error analysis circuit configured to analyze and detect an error rate for the normal data based on the error correction code and generate the bandwidth option information based on the error rate for the normal data.

14. The semiconductor memory apparatus of claim 8, wherein the bandwidth control circuit is configured to control the output bandwidth of the error correction code based on an increase of an error rate of the normal data and control the output bandwidth of the meta information code based on a decrease of the error rate of the normal data.

15. A semiconductor memory system comprising:
- a controller configured to transmit normal data, an error correction code, and a meta information code and configured to provide bandwidth option information; and
- a semiconductor memory apparatus configured to receive and store the normal data, the error correction code, and the meta information code from the controller, and transmit the normal data, the error correction code, and the meta information code that are stored therein to the controller based on the controller,
- wherein transmission bandwidths of the error correction code and the meta information code that are transmitted and received between the controller and the semiconductor memory apparatus are controlled based on the bandwidth option information.

16. The semiconductor memory system of claim 15, wherein the controller includes a bandwidth control circuit configured to set output bandwidths of the error correction code and the meta information code by controlling the transmission bandwidths of the error correction code and the meta information code based on bandwidth option information.

17. The semiconductor memory system of claim 15, wherein the semiconductor memory apparatus includes a bandwidth control circuit configured to set output bandwidths of the error correction code and the meta information code by controlling the transmission bandwidths of the error correction code and the meta information code based on bandwidth option information.

18. The semiconductor memory system of claim 15, wherein the semiconductor memory apparatus includes a bandwidth control circuit configured to set a ratio between a memory region in which the error correction code is to be stored and a memory region in which the meta information code is to be stored by controlling transmission bandwidths of the error correction code and the meta information code based on bandwidth option information.

19. The semiconductor memory system of claim 15, wherein the error correction code includes error correction parity bit information for the normal data, and the meta information code includes reliability information for the normal data.

20. The semiconductor memory system of claim 15, wherein the bandwidth option information includes transmission bandwidth information for at least one code of the error correction code and the meta information code.

\* \* \* \* \*